No. 793,225. PATENTED JUNE 27, 1905.
A. PERSICH.
VEHICLE.
APPLICATION FILED FEB. 28, 1905.
2 SHEETS—SHEET 1.
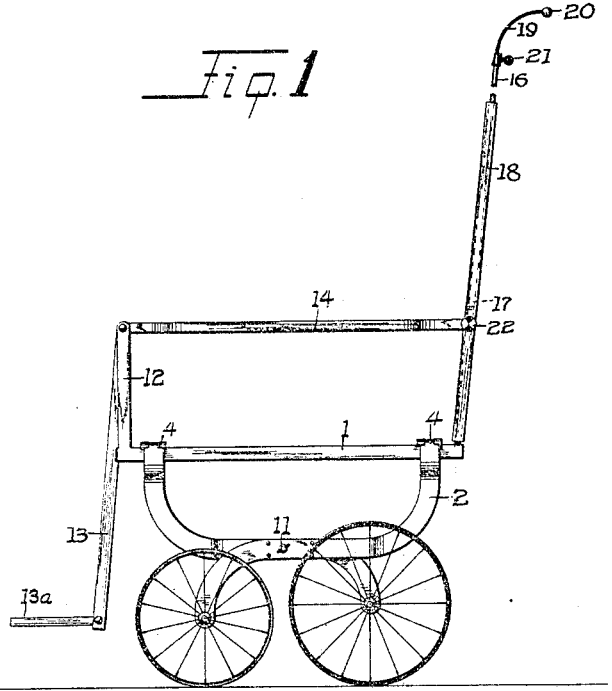
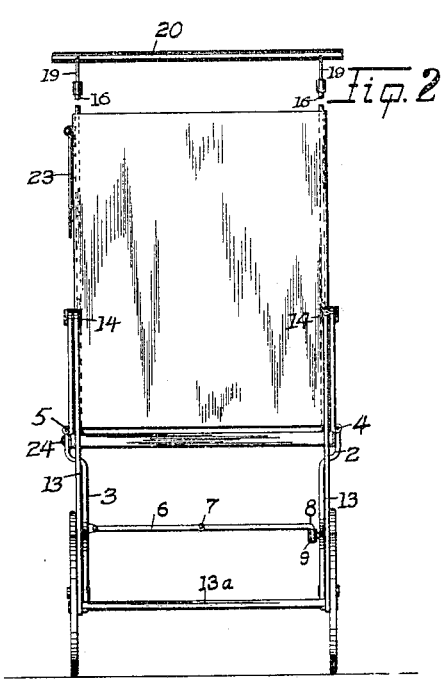
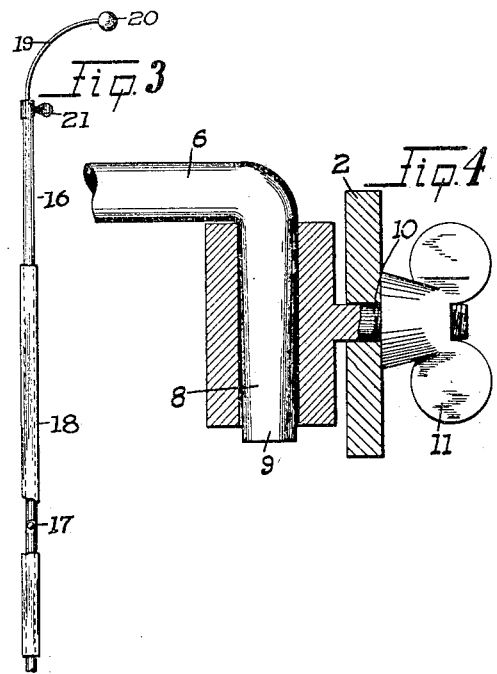
Witnesses
Frank H. Carter
Percy S. Webster
Inventor
Anton Persich
By Joshua B. Webster
Attorney

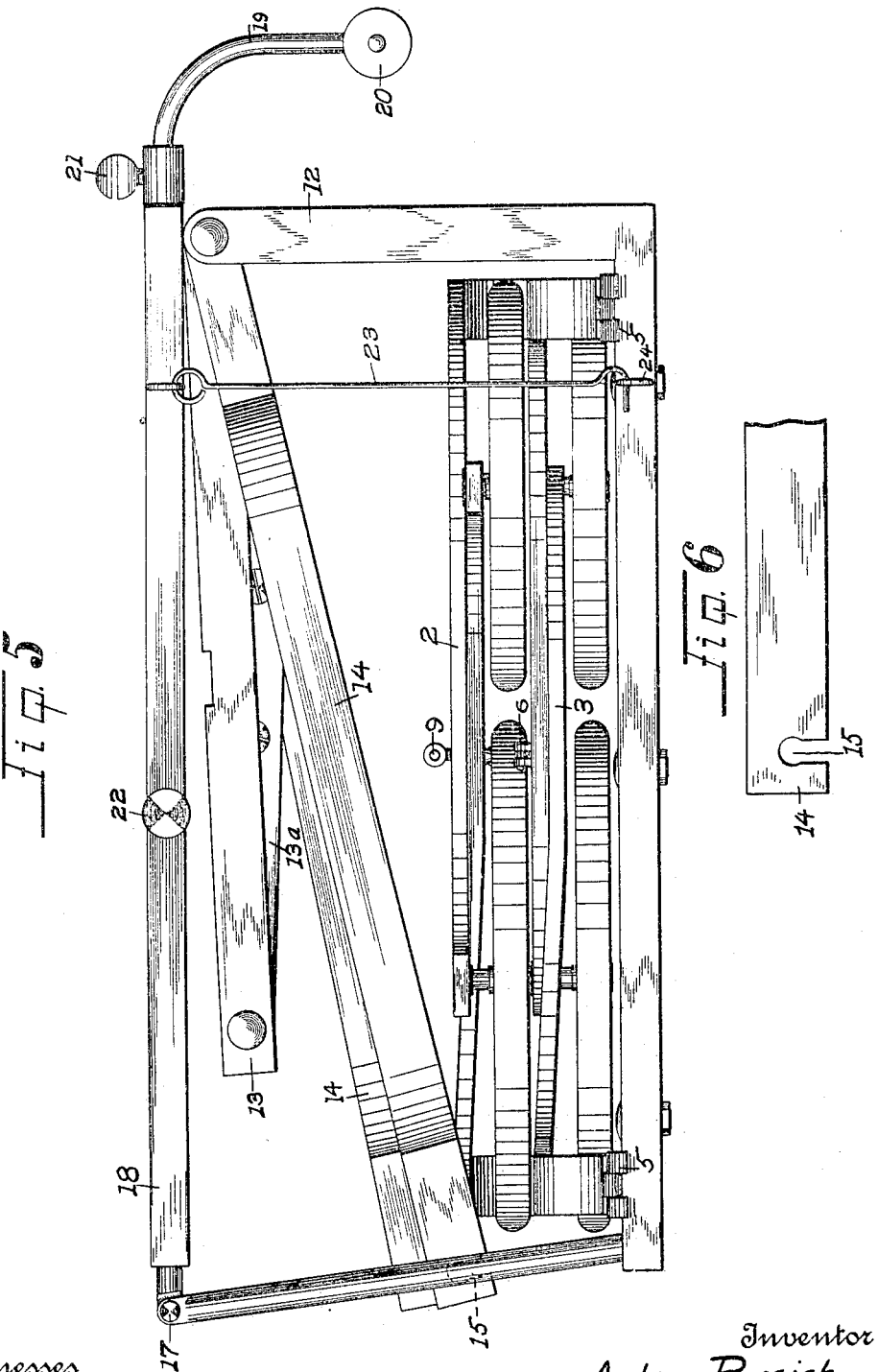

No. 793,225. Patented June 27, 1905.

UNITED STATES PATENT OFFICE.

ANTON PERSICH, OF STOCKTON, CALIFORNIA.

VEHICLE.

SPECIFICATION forming part of Letters Patent No. 793,225, dated June 27, 1905.

Application filed February 28, 1905. Serial No. 247,657.

*To all whom it may concern:*

Be it known that I, ANTON PERSICH, a citizen of the United States, and a resident of Stockton, in the county of San Joaquin and State of California, have invented certain new and useful Improvements in Vehicles, of which the following is a specification.

My invention relates to improvements in vehicles, and particularly to that class known as "go-carts" and used for the carrying of infants.

My object is to produce such a cart as may be folded up into a small and compact and convenient shape for carrying when not in use. This object I accomplish by the peculiar construction and adaptation of parts herein fully described, and particularly pointed out in the claims appended.

Reference is to be had to the accompanying drawings, in which similar characters of reference indicate corresponding parts in the several views.

Figure 1 is a side elevation of my improved go-cart. Fig. 2 is an end view of same. Fig. 3 is a side view of the back of the cart, showing a hinged arrangement incorporated therein. Fig. 4 is a sectional view of a tightening device. Fig. 5 is an end view of the cart as it appears when folded up. Fig. 6 is a side elevation of a hook.

1 designates the seat of the cart, and 2 and 3 are wheel-carrying frames hinged to the top of the seat 1 by means of hinges 4 and 5, respectively.

6 is a cross-brace pivotally secured to the center of the frame 3 and provided with a hinge 7 in the center and a hook 8 at the other end, which hook is adapted to engage with an eye 9, provided with a bolt 10, which extends through the center of the frame 2 and on which is secured a wing-nut 11, by means of which eye and wing-nut the brace 6 is pulled taut when in position, which prevents it from coming out of the said eye 9.

12 designates front posts, secured to the seat 1, to the top of which are pivotally secured rods 13, at the bottom of which is pivotally secured a foot-rest 13$^a$.

14 designates arm-rests pivotally secured to the posts 12 and provided with hooks 15 at the other ends.

16 designates back posts provided with hinges 17 at a desired distance from the seat 1, and 18 is a back slidably mounted on said posts 16 and adapted to fit down over the hinges 17 when the cart is in use, and thus hold the back rigid. The tops of the posts 16 are interiorly orificed to receive curved bars 19 of a handle 20, and 21 designates set-screws for the purpose of securing said bars rigidly in said orifices.

22 designates buttons on the side of the back 18, over which the hooks 15 fit.

23 is a hook secured to one side of the back 18 and adapted to engage with an eye 24, secured on the seat 1 in a manner hereinafter shown.

The operation is as follows: When it is desired to fold the cart, the hooks 15 are taken out of engagement with the buttons 22 and the arms 14 are turned back. The frames 2 and 3 are then turned over, so as to rest on the upper side of the seat 1. The rods 13, the foot-rest 13$^a$, and the arms 14 are then turned over the top of the said frames. The back 18 is then moved so that the hinges 17 are exposed and then turned, by means of said hinges, so as to inclose the frames 2 and 3, the arms 14, and the rods 13 and the foot-rest 13$^a$. Said back 18 is then secured to the seat 1 by means of the hook 23 and eye 24. The position of the handle may be reversed, and thus form a handle for carrying the cart, as shown in Fig. 5.

I have now entered into a detailed description of the construction and relative arrangement of parts embraced in the present and preferred embodiment of my invention. I do not desire, however, to be understood as confining myself to such specific detail, as such changes and modifications may be made in practice as fairly fall within the scope of my claims.

Having thus described my invention, what I claim as new and useful, and desire to secure by Letters Patent, is—

1. In a device of the kind described the combination with the seat of collapsible wheels secured thereto, hinged back posts secured to said seat, and a back slidably mounted on said posts, as specified.

2. In a device of the kind described the combination with a seat of collapsible wheels secured thereto, hinged back posts secured to said seat, a back slidably secured on said back posts, front posts secured to said seat, arm-pieces pivotally secured to said last-named posts and provided with hooks at their other ends, and buttons on the sides of said back adapted to engage with said hooks, as herein specified.

3. In a device of the kind described the combination of the seat, wheel-carrying frames hinged to the top of said seat, an adjustable brace secured to said frames, back posts secured to said seat and provided with hinges at a desired point, a back slidably secured on said posts, buttons secured on the sides of said back, a reversible handle secured in the top of said posts, front posts secured on said seat, arm-pieces pivotally secured on said last-named posts and provided at their other ends with hooks adapted to engage with said button, a foot-rest pivotally secured to said front posts, a hook on said back, and a corresponding eye on said seat, as set forth.

In testimony whereof I have signed my name to this specification in the presence of two subscribing witnesses.

ANTON PERSICH.

Witnesses:
PERCY S. WEBSTER,
FRANK H. CARTER.